J. H. DOUGLASS.
RESILIENT AUTOMOBILE WHEEL.
APPLICATION FILED JAN. 4, 1916.

1,197,463.

Patented Sept. 5, 1916.
2 SHEETS—SHEET 1.

Witnesses

Inventor
J. H. Douglass.
By
Attorney

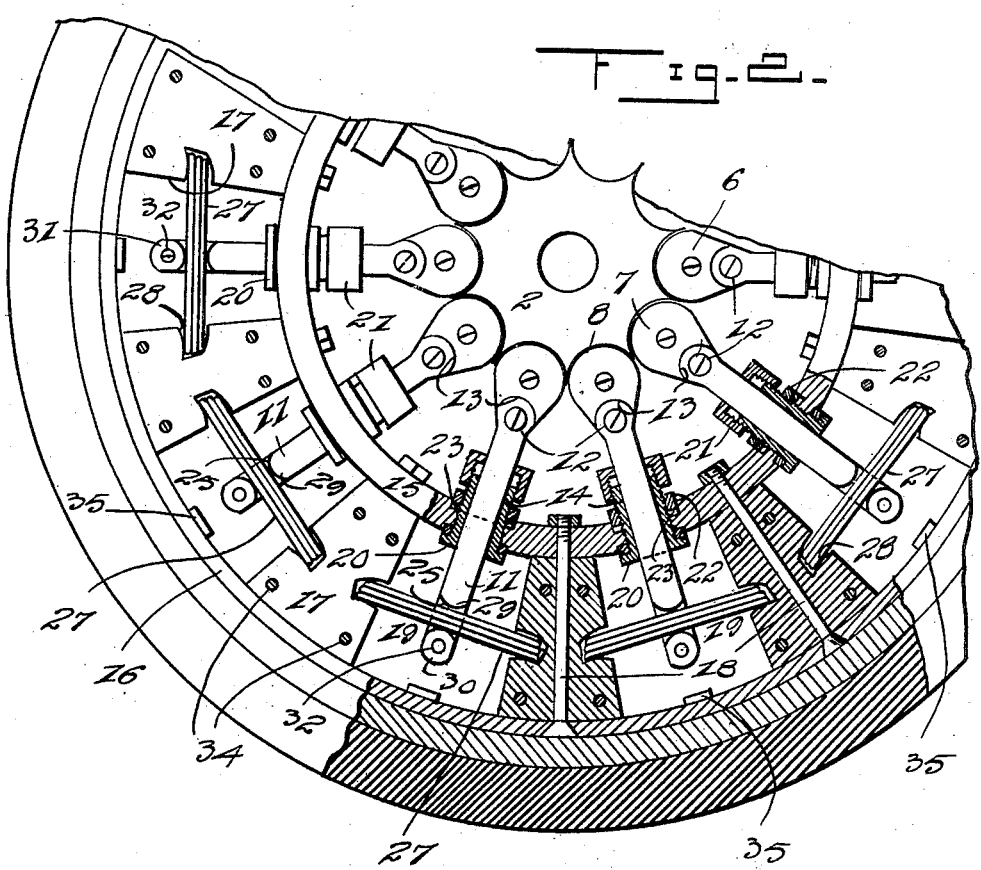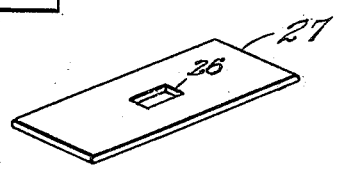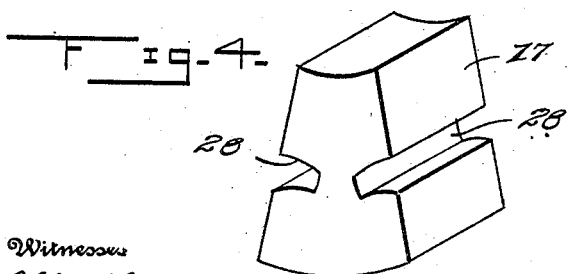

UNITED STATES PATENT OFFICE.

JAMES H. DOUGLASS, OF NORFIELD, MISSISSIPPI.

RESILIENT AUTOMOBILE-WHEEL.

1,197,463.   Specification of Letters Patent.   Patented Sept. 5, 1916.

Application filed January 4, 1916. Serial No. 70,173.

*To all whom it may concern:*

Be it known that I, JAMES H. DOUGLASS, a citizen of the United States, residing at Norfield, in the county of Lincoln and State of Mississippi, have invented certain new and useful Improvements in Resilient Automobile-Wheels; and I do hereby declare the following to be a full, clear, and exact description of the invention, such as will enable others skilled in the art to which it appertains to make and use the same.

The invention relates to improvements in resilient wheels.

The object of the present invention is to improve the construction of resilient wheels and to provide a simple, practical and comparatively inexpensive resilient wheel designed for use on automobiles, motor trucks and various other vehicles and adapted to dispense with pneumatic tires to eliminate tire troubles and capable of affording the desired resiliency and of cushioning shocks, in all directions radially of the wheel and incident to the same traveling over rough roadways and contacting with obstructions as well as the strain incident to starting and stopping a machine.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1:
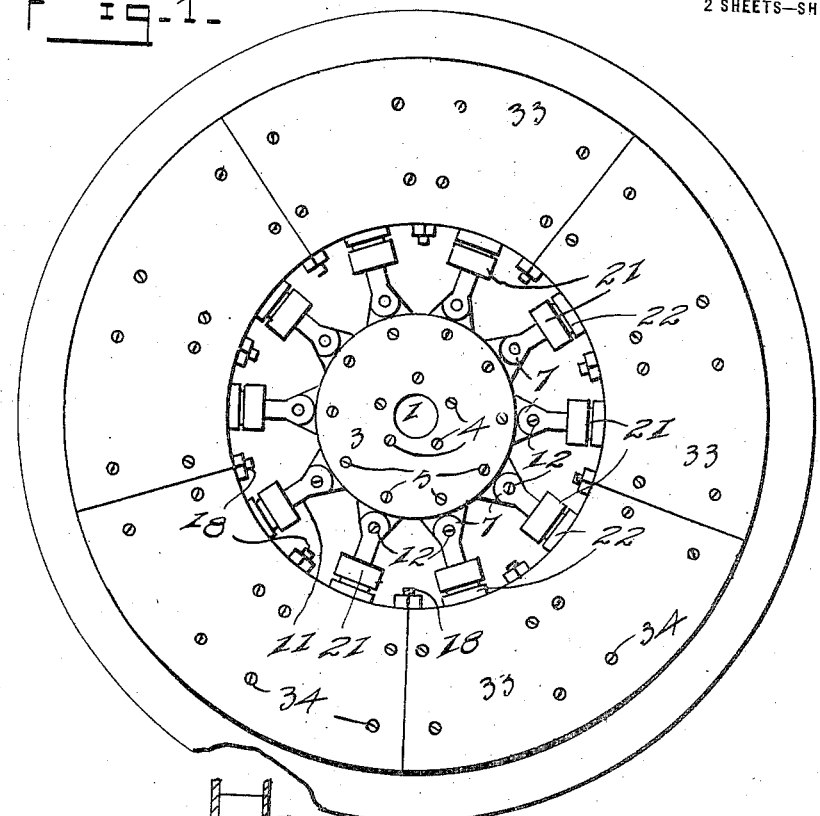
Figure 2:
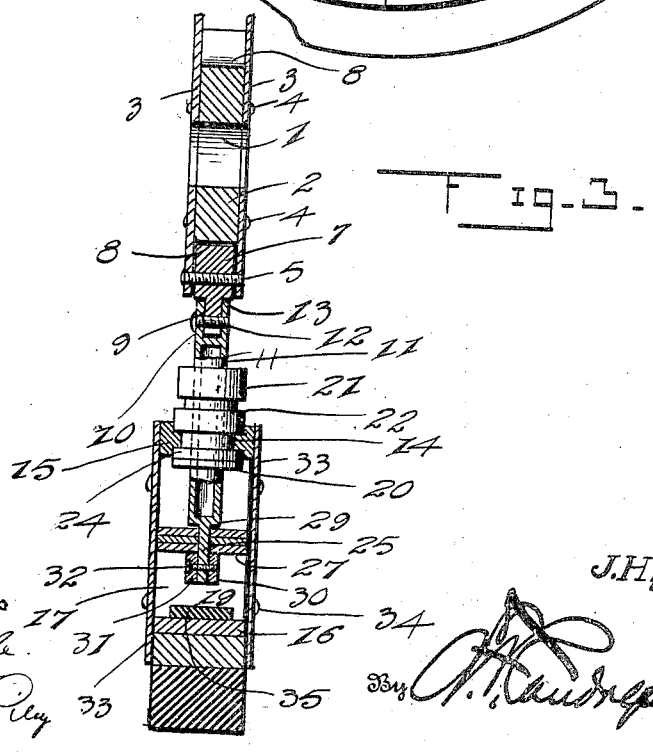

In the drawings Figure 1 is a side elevation of a wheel constructed in accordance with this invention, Fig. 2 is a sectional view taken in the plane of the wheel, Fig. 3 is a transverse sectional view, Fig. 4 is a detail perspective view of one of the radially arranged blocks or supports. Fig. 5 is a detail perspective view of one of the springs.

Like numerals of reference designate corresponding parts in the several figures of the drawings.

In the accompanying drawings in which is illustrated the preferred embodiment of the invention, the resilient wheel comprises in its construction a hub having a central opening 1 to receive an axle box, axle or the like and composed of a body portion 2 and side disks or plates 3 secured by bolts 4 to the body portion and connected at their outer portions adjacent to their peripheries by bolts 5 constituting pivots or links 6. The links 6 which are arranged in an annular series having inner rounded or substantially segmental heads 7 which are arranged in bearing recesses 8 formed in the periphery of the body portion 2 of the hub and forming knuckle joints to permit a lateral swinging of the links in the plane of the wheel. The bearing recesses which are substantially semi-circular have their side walls formed by the outer portions of the side plates of the hub and the links are preferably tapered outwardly and their outer portions 9 are reduced by recessing them at their side faces to fit in the inner bifurcated ends 10 of spokes 11 circular in cross section and preferably composed of a body portion of tubular steel and solid terminal portions. The outer reduced ends of the links are pivoted by bolts or screws 12 in the bifurcations of the inner ends of the spokes and the shoulders 13 of the links are curved to conform to the rounded ends of the spokes, the curvature of the parts being concentric with the pivots 12 to form knuckle joints for the outer ends of the links.

The spokes are slidable through and guided in stuffing boxes or tubular guides 14 carried by an inner rim or annular member 15 which is spaced from and arranged concentric with an outer annular rim or member 16. The outer annular member or rim 16 is maintained in spaced relation with the inner member or rim 15 by radially arranged supports 17, preferably consisting of blocks tapered inwardly and secured to the said inner and outer annular members or rims by radially arranged bolts 18. The radially arranged bolts 18 pierce the blocks or supports centrally thereof and the said blocks or supports are arranged at regular intervals and form intervening spaces or compartments 19 into which extend the outer ends of the spokes, the stuffing boxes or guides being adapted to not only guide the spokes but to exclude dust and dirt and moisture from the said compartments. The tubular guides or stuffing boxes are provided at their outer ends with flanges 20 and have threaded inner portions for the reception of cap nuts 21. The threaded portions of the tubular guides or stuffing boxes also receive lock nuts 22 and gaskets 23 and 24 are arranged at the inner and outer faces of the inner rim or member 15 and are engaged by the said lock nuts and the flange 20 of the tubular guide or stuffing box. The gaskets assist in excluding water and dirt from the compartments and the cap nuts may be provided with suitable packing for this purpose. The outer ends or end portions 25 are reduced by recessing them at their side faces and the said reduced portions extend through slots or openings 26 of springs 27 arranged in a circumferential series around the wheel and seated in their ends in recesses 28 in opposite sides of the radially arranged supports or blocks 17 and springs preferably consisting of a plurality of leaves which may be varied in number to provide the desired resiliency and to enable the wheel to withstand the strain incident to the vehicle for which it is desired. The reduced end portions of the spokes form inner convex shoulders 29 and the springs are also engaged by outer convex portions of circular members 30 and 31 located at opposite sides of the outer end of the reduced portion 25 of each spoke and secured to the same by a bolt 32 or other suitable fastening device which may be arranged in any desired manner.

The wheel is also provided at its outer portion with annular side plates 33 preferably constructed in section as shown in Fig. 1 of the drawings and secured to the wheel by transverse bolts 34 which pierce the sections of the side plates and the radially arranged supports. The side plates form side walls for the spaces or compartments within which the springs are arranged and by removing the sections of the side plates access may be readily had to the said spaces or compartments.

The outer rim is provided at its inner periphery with bumpers or cushions 35 of rubber or other suitable material located beyond and normally spaced from the outer ends of the spokes and adapted to be engaged by the same should the wheel be subjected to an excessive weight. The cushions are adapted to prevent noise and relieve the springs from a crushing strain.

The wheel may be equipped with any kind of a tire either solid or pneumatic and when a pneumatic tire is employed a separate rim of the clencher or other type will be provided but it is preferable to employ a tire of some yieldable noiseless material and of a solid character so as not to be affected by punctures as the springs will afford all the resiliency desired and the arrangement of the sliding spokes and the pivoted links at the inner ends of the spokes will permit a cushioning action in any direction radially of the wheel. The spokes and the springs are movable independently of one another and each is unaffected in its action by the operation of the other so that the spokes are capable of cushioning shocks from a plurality of directions simultaneously. The wheel is adapted for use on automobiles, trucks and the like and the number and size of the leaves of the springs may be varied to provide springs of the requisite strength. The springs are flexed by the inward outward movement of the spokes and the convex curvatures which engage the springs admit of a ready flexing of the springs without injury to the same through contact therewith.

What is claimed is:—

1. A wheel of the class described including a hub, an outer portion surrounding the hub and arranged in spaced relation with the same, spokes slidable in the outer portion of the wheel, an annular series of springs located at the outer ends of the spokes and supported at their terminals and connected at an intermediate point with the said spokes for cushioning the same and means for connecting the inner ends of the spokes with the hub.

2. A wheel of the class described including a hub, an outer portion surrounding the hub and arranged in spaced relation with the same, said outer portion being provided at intervals with spaced supports, springs connected at their ends to the spaced supports, spokes slidable in the outer portion of the wheel and connected at their outer ends with the springs at a point intermediate of the ends thereof and means for connecting the inner ends of the spokes with the hub.

3. A wheel of the class described including a hub, an outer portion surrounding the hub and arranged in spaced relation with the same, said outer portion comprising inner and outer annular members, radially arranged supports connecting the inner and outer members and arranged at intervals, springs extending across the spaces between the supports and connected at their ends to the same, spokes slidable in the outer portion of the wheel and connected with the springs intermediate of the ends thereof and means for connecting the inner ends of the spokes with the hub.

4. A wheel of the class described including a hub, an outer portion comprising spaced annular members, radial supports arranged at intervals and connecting the inner and outer members and provided at opposite sides with recesses forming seats, springs extending across the spaces between the said supports and having their terminal portions seated in the said recesses, spokes slidable in the outer portion of the wheel and connected with the spring between the ends thereof and means for connecting the spokes with the hub.

5. A wheel of the class described including a hub, an outer portion surrounding the hub and spaced therefrom and provided at intervals with supports, springs arranged in the outer portions of the wheel and connected at their ends to the said supports and provided with slots or openings, spokes slidable on the outer portion of the wheel and having their outer ends extending through the said slots or openings of the springs and provided at their outer portions with shoulders for engaging the springs at the inner sides thereof and means projecting laterally from the outer portions of the spokes for engaging the springs at the outer sides thereof, said spokes being connected at their inner ends with the hub.

6. A wheel of the class described including a hub, an outer portion comprising inner and outer annular members, substantial radial supports interposed between the inner and outer members and secured to the same and arranged at intervals and side plates also connecting the inner and outer members, springs extending across the spaces between the supports, stuffing boxes mounted on the inner member and forming guides, spokes slidable in the guides and connected at their outer ends with the said springs and links connecting the inner ends of the spokes with the hub.

In testimony whereof I affix my signature in presence of two witnesses.

JAMES H. DOUGLASS.

Witnesses:
JOHN J. STEVENS,
W. B. HIGHLANDS.

Copies of this patent may be obtained for five cents each, by addressing the "Commissioner of Patents, Washington, D. C."